United States Patent [19]
Rodriguez

[11] Patent Number: 5,862,821
[45] Date of Patent: Jan. 26, 1999

[54] APPARATUS FOR WASHING LEAFY PLANT PRODUCTS

[76] Inventor: Jeffrey J. Rodriguez, 380 Whippet Run, Corralitos, Calif. 95076

[21] Appl. No.: 935,747

[22] Filed: Sep. 23, 1997

Related U.S. Application Data

[60] Provisional application No. 60/026,485 Sep. 23, 1996.

[51] Int. Cl.$^6$ ........................................................ B08B 3/04
[52] U.S. Cl. .............................. 134/65; 99/536; 134/25.3; 134/61; 134/102.2; 134/132; 134/182; 134/186; 134/199; 406/48
[58] Field of Search ............................... 134/25.3, 61, 65, 134/102.1, 102.2, 132, 182, 186, 199; 99/536; 15/3.14, 3.15; 406/48, 94, 95, 136, 137

[56] References Cited

U.S. PATENT DOCUMENTS

| | | | |
|---|---|---|---|
| 1,374,341 | 4/1921 | Vaudreuil | 134/25.3 X |
| 2,467,888 | 4/1949 | Harlow | 134/86 |
| 2,666,711 | 1/1954 | Crosset | 99/204 |
| 3,447,544 | 6/1969 | De Vergara | 134/60 |
| 3,664,354 | 5/1972 | Minbiole, Jr. et al. | 134/61 |
| 3,683,945 | 8/1972 | Weisser | 134/68 |
| 3,918,116 | 11/1975 | Valdespino | 15/3.13 |
| 4,509,545 | 4/1985 | Trotter | 134/199 |
| 4,549,478 | 10/1985 | Entes | 99/536 |
| 5,097,755 | 3/1992 | Hill | 99/484 |
| 5,148,566 | 9/1992 | Nishibayashi | 15/3.15 X |
| 5,413,161 | 5/1995 | Medlock | 134/104.4 |
| 5,744,184 | 4/1998 | Kendall et al. | 99/536 X |

FOREIGN PATENT DOCUMENTS

| | | | |
|---|---|---|---|
| 1285957 | 1/1962 | France | 406/137 |
| 374712 | 9/1939 | Italy | 99/536 |

*Primary Examiner*—Philip R. Coe
*Attorney, Agent, or Firm*—Jeffrey P. Aiello; Carol D. Titus; James J. Leary

[57] ABSTRACT

An improved and simplified apparatus and method for washing leafy plant products is provided. The invented apparatus utilizes hydro-energy for sufficiently cleaning plant products being processed thereby, while effectively using water recirculating therethrough. The apparatus comprises a plant product loading assembly coupled to a cleansing flume. The loading assembly comprises a conical receiving section having a plurality of spray nozzles located about the periphery thereof to form a turbulent water flow through the loading assembly that completely submerges plant product disposed in the receiving section. This ensures that a maximum amount of plant product mixes with the water to form a slurry that optimizes water usage and quickly cleans the product. The flow rate of the water flowing through the spray nozzles does not damage the plant product. The configuration of the loading assembly inhibits collection of debris for maintaining sanitation of the apparatus. A water distribution manifold is provided for controlling water flowing to the spray nozzles. The manifold is configured to facilitate sanitation and other maintenance procedures performed thereon. The flume is configured to maintain plant product flowing therethrough submerged for effectively cleaning the product, while optimizing as workspace occupied by the apparatus. The flume comprises a plurality of tubes that are provided with baffles positioned along a bottom surface thereof. The baffles are positioned to cause water passing through the tube to flow in a helical motion. The helical motion of the water maintains the plant product almost completely submerged, while cleaning the product.

18 Claims, 6 Drawing Sheets

APPARATUS FOR WASHING LEAFY PLANT PRODUCTS

BACKGROUND OF THE INVENTION

This application is a continuation-in-part of U.S. Provisional Patent Application Ser. No. 60/026,485, filed on Sep. 23, 1996.

1. Field of the Invention

The present invention relates generally to apparatus and methods for washing fruits and vegetables, and more particularly, to an improved and simplified apparatus and method for washing plant products and particularly leafy plant products.

2. Description of Related Art

There are a number of devices in the prior art directed toward cleaning fruits and vegetables prior to packaging the fruits and vegetables for the retail marketplace. These devices typically receive newly harvested plant product, then process the plant product for cleaning and performing other processing prior to packaging the plant product for the retail marketplace. These devices typically comprise substantially large, robust pieces of machinery that may be wholly, or partially, automated.

These devices usually include a plant product receiving area for receiving the newly harvested plant products. A processing assembly is typically coupled to the receiving area. The processing area may include a washing assembly, that can include a plant product conveyance assembly containing recirculating water for removing dirt, insecticides, and other undesired particulate matter from the plant products. A drying assembly may optionally be coupled to the washing assembly for drying the cleansed plant products prior to packing the plant product for distribution to retail marketplaces.

A number of such devices are disclosed in the prior art. For example, U.S. Pat. No. 2,467,888, to Harlow, discloses an apparatus for washing plant products. The disclosed apparatus includes a table structure mounted for rotation about an upright axis. The table structure comprises a produce supporting top adapted to retain the produce thereon. The top is coarsely apertured so that when water is sprayed at produce retained on the top, as the water detaches waste from the produce, the apertures are sufficiently large to enable removal of the waste from the table top. The apparatus includes means for spraying the water and means for rotating the table. Further included is a pan that includes separate means for preventing exit of the waste through a water discharge outlet.

U.S. Pat. No. 3,683,945, to Weisser, is directed to a flood cell apparatus for conveying and processing materials for washing conveying, and processing vegetables and the like. The apparatus comprises an inclined tank that has a rounded bottom, a closed inlet end, and an open outlet end. The outlet end is upraised relative to the inlet end to define a flood level over which liquid introduced into the tank, leaves the tank. Nozzles direct streams of water under pressure from the inlet end of the tank toward the outlet end for impelling vegetables toward the outlet end. The nozzles create turbulence in the water for cleaning the vegetables. Waste material is detached from the vegetables and moves toward the inlet end where a waste outlet is provided for removing the waste, while the vegetables are moving toward the outlet end of the apparatus.

Another device for washing produce is disclosed in U.S. Pat. No. 5,413,131, to Medlock. The disclosed washer includes an elongated open top tank that contains water. The tank has a loading end and an opposing exit end. A plurality of outlet nozzles are positioned transversely across the tank and are spaced along the fall length thereof above the water line. A plurality of baffles are positioned in the tank in a staggered arrangement. The nozzles and baffles, along with the water in the tank, coact to draw produce loaded into the tank completely underwater. The produce is moved in an agitating serpentine pattern as it is moved toward the exit end of the tank.

U.S. Pat. No. 3,447,544, to De Vergara, is directed to an apparatus for washing and drying of fruit. The apparatus causes fruit to pass through a series of water baths under the influence of water pressure, under a rinsing spray, and finally between jets of air for drying the fruit.

U.S. Pat. No. 5,097,755, to Hill, discloses a method and apparatus for processing produce, and particularly fresh vegetables for salads. The disclosed apparatus includes a cleaning assembly the includes high pressure nozzles that spray chlorinated water at the desired storage temperature of the vegetables.

U.S. Pat. No. 2,666,711, to Crosset, discloses a method and apparatus for processing leafy vegetables, and particularly for drying leafy vegetables such as spinach. U.S. Pat. No. 4,549,478, to Entes, is directed to an apparatus for washing slices of a tuberous plant, such as potatoes. U.S. Pat. No. 3,918,116, to Valdespino, is directed to a food lift and U.S. Pat. No. 4,509,545, to Trotter, discloses a portable washing and spray assembly.

However, the various methods and apparatus of the prior art have suffer from a number of disadvantages. One disadvantage common to the above enumerated prior art references, and specifically those apparatus directed toward cleaning leafy vegetables, is that they are not well suited for cleaning substantially large volumes of the leafy vegetables. Often as these vegetables are being conveyed along the washing portion of the apparatus, the leafy vegetables collect and clog the washing portion of the apparatus. Unfortunately, operators are needed for monitoring these clogs, which adds to the cost associated with processing of the vegetables.

Another disadvantage found in the prior art, is that as the plant product is conveyed along the washing portion of the apparatus, the plant product is often not completely submerged or not submerged for a sufficiently long time period. This usually results in the plant product not being sufficiently cleansed.

A farther disadvantage of the prior art is that the water spray nozzles spray water under excessive pressure. This often causes the water to contact the plant product with enough force to damage the leaves of the plant products. Additionally disadvantageous of the prior art, is that it is often time consuming to drain and fill the water recirculating through the plant product washing portion of the apparatus. This may cause the water to not be replaced at proper intervals, such as when the water becomes excessively dirty, resulting in the plant product passing through the washing portion not being sufficiently cleaned. Another disadvantage is that these apparatuses are excessively large and consume unnecessary quantities of workspace.

Thus, there exists a need for an improved and simplified apparatus and method for washing plant products and particularly leafy plant product.

OBJECTS OF THE INVENTION

It is therefore an object of the present invention to provide an improved and simplified apparatus for washing plant products and particularly leafy plant products;

It is another object of the present invention to provide an improved and simplified apparatus for washing plant products and particularly leafy plant products that is configured to facilitate fluid flow therethrough to inhibit clogging of plant products passing therethrough and for maintaining sanitation thereof;

It is a further object of the present invention to provide an improved and simplified apparatus for washing plant products and particularly leafy plant products that completely submerges the plant products for a sufficiently long time period to cleanse the plant products;

It is still another object of the present invention to provide an improved and simplified apparatus for washing plant products that sufficiently removes unwanted particulate matter from the plant products without causing harm thereto;

It is yet a further object of the present invention to provide an improved and simplified apparatus for washing plant products that is well suited for processing large volumes of plant product;

It is another object of the present invention to provide an improved and simplified apparatus for washing plant products that efficiently utilizes the water recirculating therethrough;

It is a still further object of the present invention to provide an improved and simplified apparatus for washing plant products that is substantially compact for efficiently utilizing workspace; and It is a yet another object of the present invention to provide an improved and simplified apparatus for washing plant products that enables water recirculating therethrough to be replaced quickly.

SUMMARY OF THE INVENTION

These and other objects and advantages of the present invention are achieved by providing an improved and simplified apparatus for washing plant products and particularly leafy plant products. The apparatus of the present invention is configured to efficiently utilize hydro-energy for sufficiently cleaning plant products being processed thereby, while effectively using water recirculating therethrough.

In the preferred embodiment, the apparatus of the present invention comprises a plant product loading assembly coupled to a cleansing flume. The loading assembly comprises a conical receiving section that has a plurality of spray nozzles located about the periphery of a relatively wide open end thereof. The direction of water sprayed from each nozzle is adjusted to form a swirling or turbulent water flow through the loading assembly that completely submerges plant product disposed in the receiving section to form a plant product slurry. The water-plant product slurry produced in the receiving section ensures that a maximum amount of plant product mixes with the water to form a slurry that optimizes water usage and quickly cleans and chills, if it is desired to chill, the plant product. The flow rate of the water flowing through the spray nozzles is adjustable for maximizing mixing plant product with the water to from the slurry, while not damaging the plant product due to excessive water pressure. The flow rate of water recirculating through the invented apparatus can range from 50 to 700 gallons per minute (GPM). Preferably, the flow rate ranges between approximately 300 to 400 GPM.

The loading assembly of the invention further includes a transitional section made integral with the receiving section for coupling the loading assembly to the cleansing flume. The transitional section is configured to optimize fluid, and thus the water-plant product slurry, flowing therethrough. Preferably, the transitional section is conical in cross-sectional configuration for mating to the receiving section and for tapering the diameter of the loading assembly from the wide opening in the receiving section down to the diameter of the flume. The transitional section is also arcuate along its length for coupling the receiving section to the cleansing flume, which extends along in a somewhat downwardly, generally horizontal direction. The conical in cross-sectional configuration of the transitional section, along with the configuration of the receiving section, inhibits collection of debris and unwanted particulate matter, for maintaining sanitation of the invented apparatus. The configuration of the transitional section further promotes maximum flow of the slurry through the loading assembly to prevent clogging of the slurry, to provide high plant product processing rates.

Further, an additional spray nozzle may be mounted in the transitional section. The additional spray nozzle would be provided to maintain the turbulence of the slurry flowing through the transitional section, to enhance mixing of the plant product with the water for cleaning the plant product.

In the preferred embodiment a water distribution manifold is mounted to the periphery of the apparatus, and preferably proximal to the transitional section, and coupled to the spray nozzles for controlling water flowing thereto. The manifold is configured with flow control valves for controlling the flow rate of water output by each of the spray nozzles to prevent damage to the plant product, while maintaining optimal mixture of the plant products with the water for forming the slurry. The manifold is preferably releasably mounted to the transitional section to that it may be quickly detached therefrom for performing maintenance on the manifold and so that water recirculating through the apparatus can be easily replaced. Additionally, the manifold comprises an uncomplicated design so that daily sanitation and other maintenance procedures can be performed thereon without an operator having to perform a number of complicated tasks.

The cleansing flume of the preferred embodiment of the present invention is configured to maintain plant product flowing therethrough substantially completely submerged for effectively cleaning the plant product. Preferably, the cleansing flume comprises at least one elongated tubular member, or tube, coupled to the transitional section of the loading assembly. The tubes may have an open upper end to allow access to the interior thereof. The opening formed in the upper end of the tubes is narrow enough to inhibit water passing therethrough from spilling, while being just sufficiently wide to allow access to the interior thereof.

A plurality of tubes may be interconnected for thoroughly cleaning the plant product passing therethrough. Connecting portions for coupling adjacent tubes together comprise substantially arcuate members that are configured to couple adjacent tubes together while maintaining the flow rate of water and plant products passing through the flume. The connecting portions may comprise either 45 degree or 90 degree arcuate elbow tubing, so that the tubes extend in either perpendicularly or parallel to one another, depending upon the desired path of the cleansing flume. The flume formed by the tubes and connecting portions can be configured for maximizing compactness of the invention to optimize workspace occupied by the apparatus of the present invention.

Each of the tubes is preferably provided with a plurality of baffles or flow diverters that are spatially positioned along a bottom surface thereof. The baffles are affixed to the bottom surface so that they extend across the surface at an obtuse angle to a longitudinal axis of the tube for causing water passing through the tube to flow in a helical motion. The helical motion of the water, and thus the water-plant product slurry, flowing through the tube maintains the plant product substantially completely submerged, while sufficiently agitating the plant product to clean the product, without causing damage thereto.

Additionally, the baffles may be configured with a curvilinear top edge. The configuration of the top edge of each of the baffles is configured to prevent damage from coming to plant products, and particularly to the leaves of leafy plant products such as spinach, when contacting the baffles. The configuration of the top edge additionally aides with maintaining the helical pattern of water flowing through the tubes to keep the plant products submerged in the water.

Optionally, a spray nozzle may be interposed between each of the baffles. The nozzles are oriented between adjacent baffles, such that the nozzle sprays water in the direction of the helical flow, to aid and maintain the flow rate of water-plant product flowing through the tube. This prevents the plant product from collecting in the flume and clogging. Therefore, the need for operators monitoring the flume is obviated. Additionally, water flowing to the spray nozzles may be aerated to further aid with removing waste matter from the plant product for cleaning the product.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventor of carrying his invention. Various modifications, however, will remain readily apparent to those skilled in the art, since the generic principles of the present invention have been defined herein.

Figure 1A:
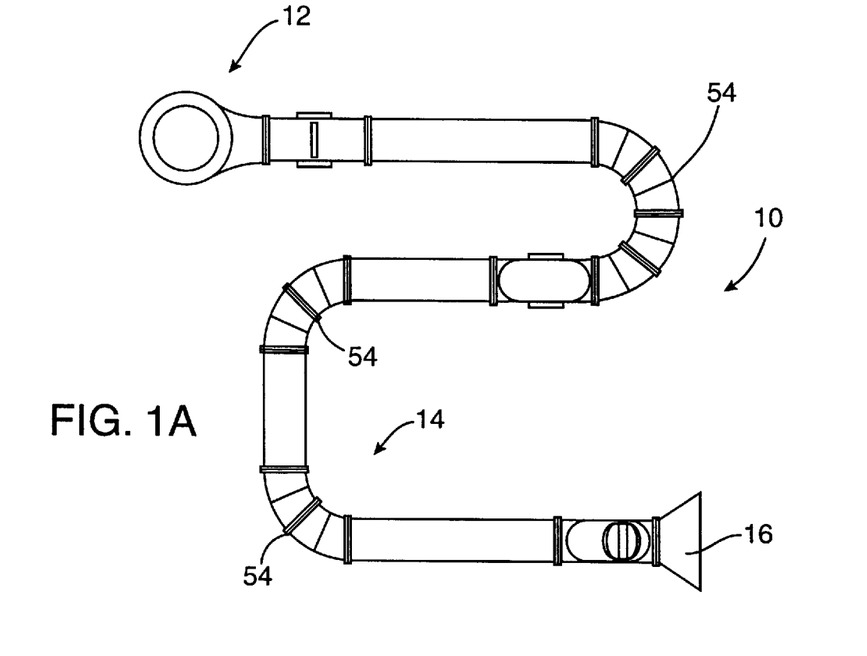
FIG. 1A and FIG. 1B are schematic views showing a preferred embodiment of an improved and simplified apparatus for washing plant products and particularly leafy plant products of the present invention.

Referring now to the drawing Figures, and particularly to FIG. 1A, there is shown generally at 10, a preferred embodiment of an improved and simplified apparatus for washing plant products, and particularly leafy plant products, constructed according to the principles of the present invention. The apparatus 10 of the present invention is particularly well suited for washing leafy plant products, such as spinach, kale, lettuce, and a number of other leafy vegetables. The apparatus 10 of the present invention is configured to efficiently utilize hydro-energy for sufficiently cleaning plant products being processed thereby, while effectively using water recirculating therethrough.

In the preferred embodiment, the invented apparatus 10 comprises a plant product loading assembly 12 coupled to a cleansing flume 14. The apparatus 10, and particularly the cleansing flume 14, is configured and routed for maximizing compactness of the invention 10 to optimize usage of workspace occupied thereby. The invented apparatus 10 is preferably mounted on a platform (not shown) using known methods. Additionally, the flume 14 is mounted such that it extends downwardly from the loading assembly 12 to an outlet end 16 of the apparatus 10, to aid water and plant products flowing therethrough.

The configuration of the plant product loading assembly 12 and cleansing flume 14, to be thoroughly discussed hereinafter, enhances the ease with which fluid flows through the invented apparatus 10. Thus, the present invention 10 is capable of recirculating water flowing at a relatively high flow rate, without requiring a plurality of water pumping means, as was necessitated in the prior art. The loading assembly 12 and cleansing flume 14, along with each of the components thereof, preferably comprise a suitable material that maintains the sanitary properties of the apparatus 10, while be sufficiently strong and durable. In the preferred embodiment the loading assembly 12 and cleansing flume 14 may comprise appropriate metal alloys, such as stainless steel, or suitable polymers, such as polyvinyl chloride (PVC), for example.

Figure 1B:
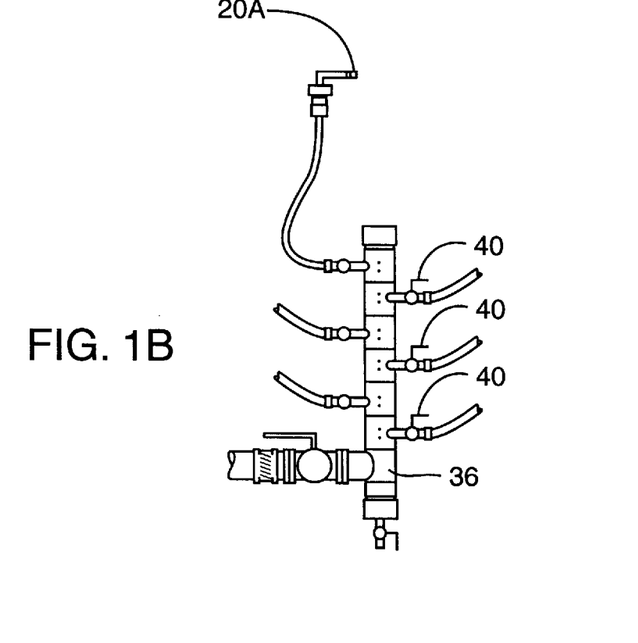
Figure 2:
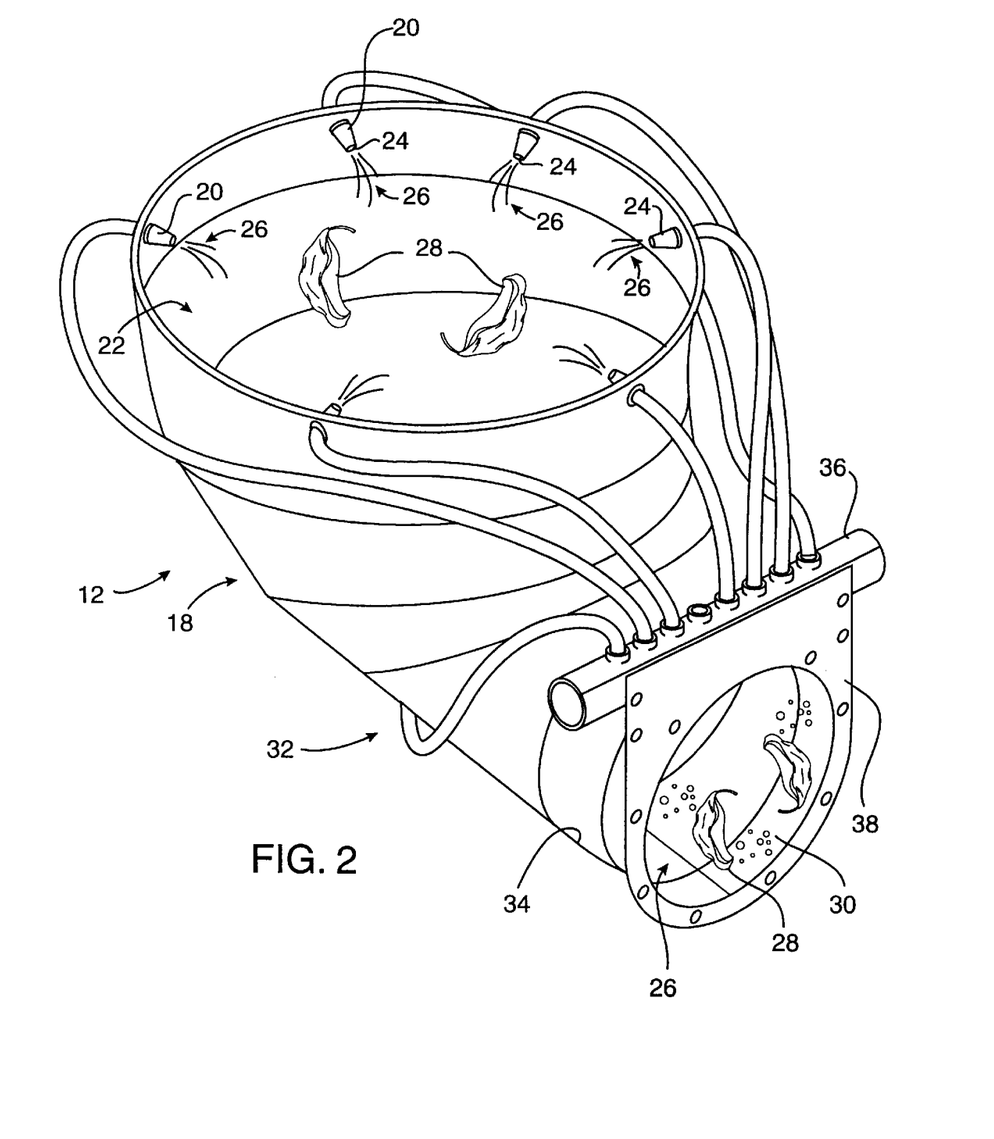
FIG. 2 is a perspective view showing a loading assembly of the preferred embodiment of the present invention.

Referring now to FIG. 1A, FIG. 1B, and FIG. 2 of the drawings, the loading assembly 12 of the preferred embodiment comprises a conical receiving section, shown generally at 18, that has a plurality of spray nozzles 20 located about the periphery of a substantially wide opening 22 thereof. The opening 22 is substantially wide, ranging from approximately 25 to 36 inches, and preferably approximately 34 inches, to accommodate large volumes of plant product being continuously disposed therein.

Each of the spray nozzles 20 is mounted to the receiving section 18 adjacent to the periphery of opening 22 using well known means, such as bolting for example. The spray nozzles 20 are mounted to enable positioning of an outlet 24 of each of the nozzles 20 for adjusting the direction of water 26 being sprayed from each spray nozzle 20. Most preferably, the spray nozzles 20 are positioned relative to each other, so that the water 26 sprayed outwardly from the spray nozzles 20 forms a swirling or turbulent water flow through the conical loading assembly. The turbulent water flow created by the positioning of the nozzles 20 quickly completely submerges plant product 28 disposed in the receiving section's opening 22 to form a plant product slurry 30. The water-plant product slurry 30 produced in the receiving section ensures that a maximum amount of plant product 28 mixes with the water 26 to form a slurry that optimizes water usage and quickly cleans and chills, if it is desired to chill, the plant product 28.

The flow rate of water 26 flowing through the spray nozzles 20, and throughout the apparatus 10 and thus the flume 14, is adjustable for maximizing mixing plant product 28 with the water 26 to form the slurry 30, while not damaging the plant product 28 due to excessive water pressure. The flow rate of water recirculating through the invented apparatus 10 can range from 50 to 700 gallons per minute (GPM). Preferably, the flow rate ranges between approximately 300 to 400 GPM.

The loading assembly 12 of the invention 10 further includes a transitional section, shown generally at 32, made integral with the receiving section 18 for coupling the loading assembly 12 to the cleansing flume 14. The transitional section 32 is configured to optimize fluid, and thus the water-plant product slurry 30, flowing therethrough. Preferably, the transitional section 32 is conical in cross-sectional configuration, for mating to the receiving section 18 and for tapering the diameter of the wide opening 22 in the receiving section 18, down to a selected diameter of the flume 14.

The transitional section 32 is arcuate along its length for coupling the receiving section 18 to the cleansing flume 14. The conical cross-sectional configuration of the transitional section 32, along with the configuration of the receiving section 18, inhibits collection of debris and unwanted particulate matter, for maintaining sanitation of the invented apparatus 10. The configuration of the transitional section 32 further promotes maximum flow of the slurry 30 through the loading assembly 12 to prevent clogging of the loading assembly 12 due to the plant product 28 sufficiently mixing with the water 26 to form the slurry 30. This provides high plant product processing rates by enabling large volumes of plant product 28 to be disposed in the loading section 12.

Further, an additional spray nozzle 20A may be mounted on a bottom surface 34 of the transitional section 32. The additional spray nozzle 20A is positioned to spray water 26 upwardly toward the receiving section 18, to maintain the turbulence of the slurry 30 flowing through the transitional section 32, to enhance mixing of the plant product 28 with the water 26 for cleaning the plant product 28.

Figure 3:
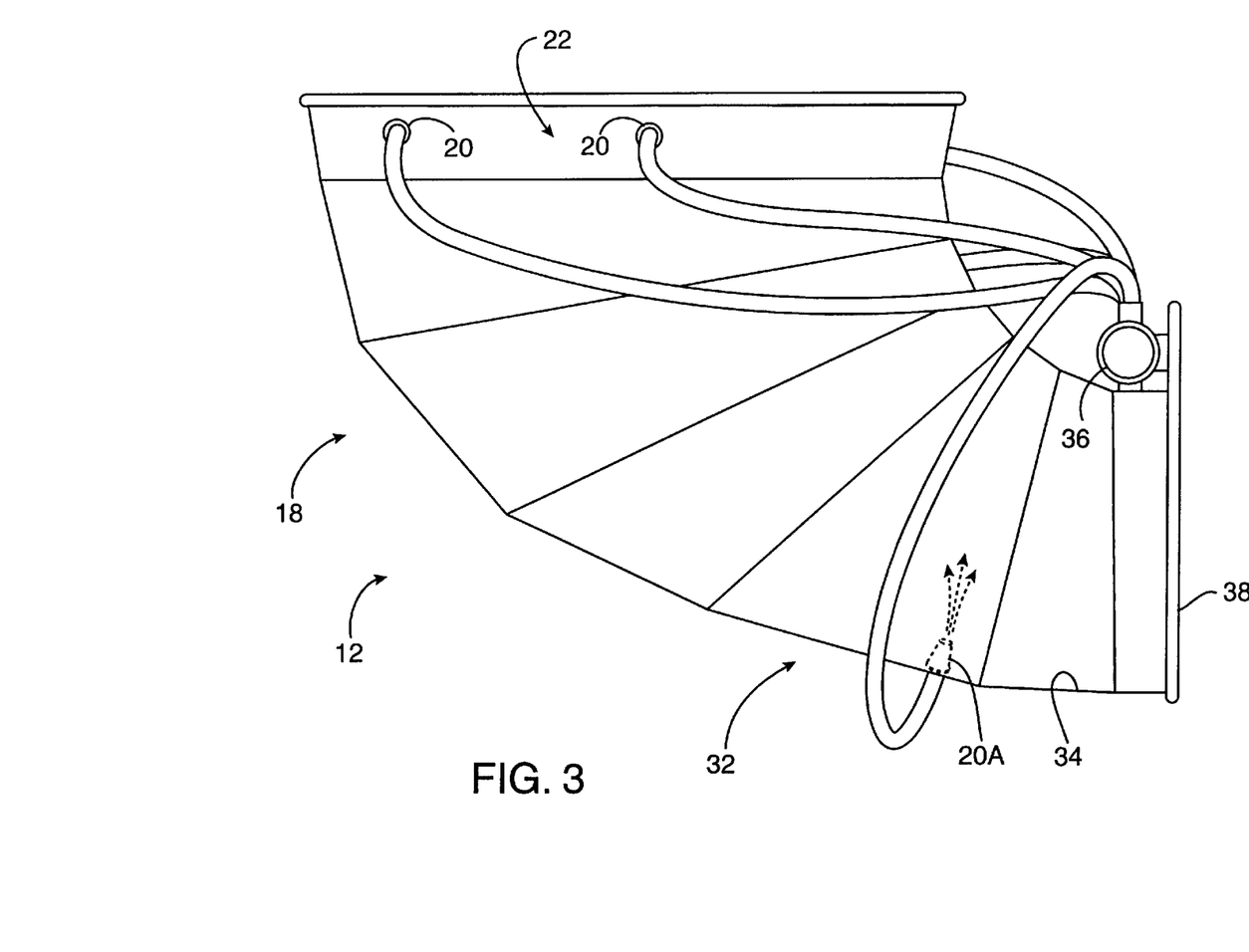
FIG. 3 is a side-elevational view showing the loading assembly of the present invention.

Referring still to FIGS. 1–3, in the preferred embodiment, a water distribution manifold 36 is mounted to the periphery of the apparatus 10 and proximal to the transitional section 32. Preferably, the manifold 36 is mounted on an interconnection 38 of the loading assembly 12 and flume 14. This mounting of the manifold 36 enables the loading assembly 12 and manifold 36 to be quickly disconnected from the flume 14 to facilitate cleaning and other maintenance procedures performed on the assembly and manifold 36. The manifold 36 is preferably releasably mounted to the transitional section 32 so that it may be quickly detached therefrom, for performing maintenance on the manifold 36 and so that water 26 recirculating through the apparatus 10 can be easily replaced. Additionally, the manifold 36 comprises an uncomplicated design so that daily sanitation and other maintenance procedures can be performed thereon without an operator having to perform a number of complicated tasks.

As shown in FIG. 1B, the water distribution manifold 36 is coupled to each of the spray nozzles 20, 20A for controlling water flowing thereto. The manifold 36 is configured with flow control valves 40 for independently controlling the flow rate of water output by each of the spray nozzles 20, 20A. The flow control valves 40 also adjust the flow rate of water output by each of the spray nozzles 20, 20A to adjust the swirling action and turbulence patterns of the water 26 in the receiving section 18. This prevents damage to the plant product 28, while maintaining optimal mixture of the plant products with the water 28 for forming the slurry 30.

Figure 4:
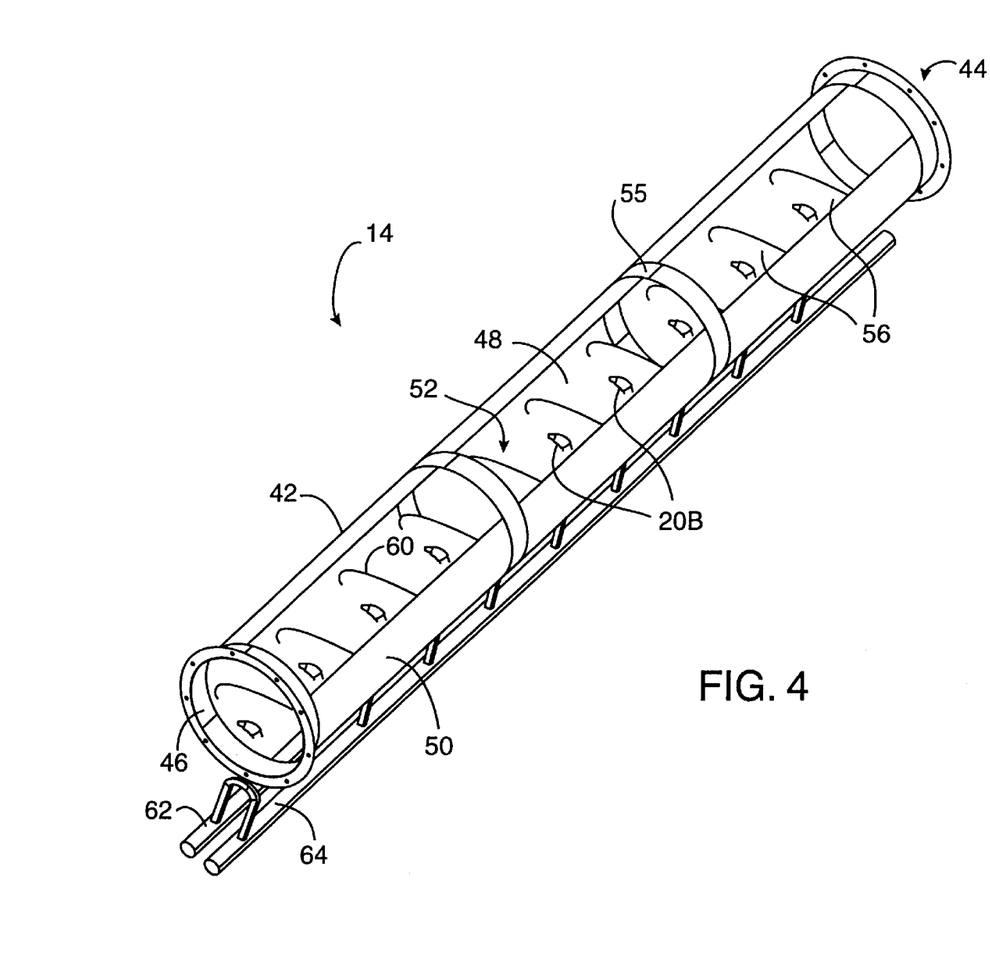
FIG. 4 is a perspective view showing a portion of a cleansing flume of the preferred embodiment of the present invention.
Figure 5:
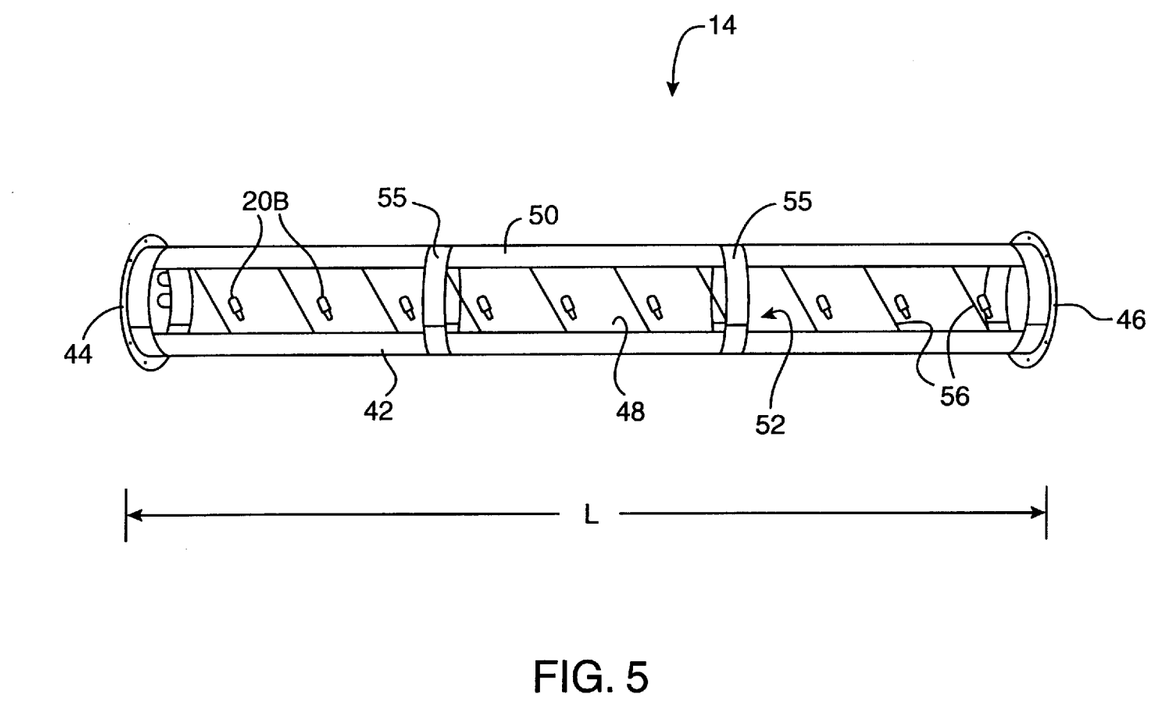
FIG. 5 is a top elevational view showing a portion of the cleansing flume of the preferred embodiment.
Figure 6:
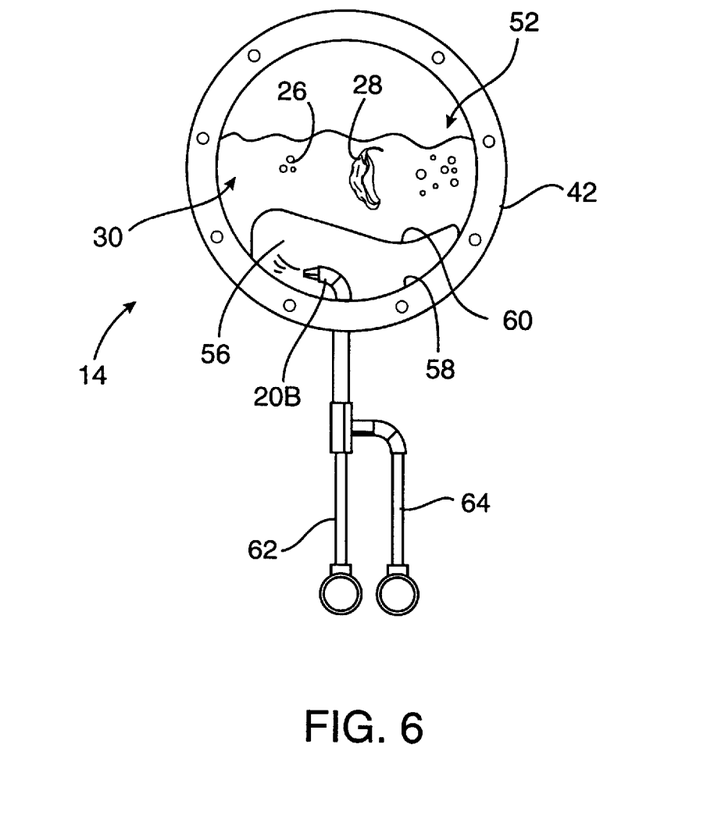
FIG. 6 is a cross-sectional view showing the cleansing flume of the present invention.

Referring now to FIGS. 4–6 of the drawings, the cleansing flume 14 of the preferred embodiment of the present invention 10 is configured to maintain plant product 28 in the water-plant product slurry 30, flowing therethrough substantially completely submerged for effectively cleaning the plant product 28. Preferably, the cleansing flume 14 comprises at least one elongated tubular member, or tube 42, having an inlet end 44 and an outlet end 46. The inlet end 44 of one of the tubes 42 is secured to the interconnection 38 of the transitional section 32 for coupling the flume 14 to the loading assembly 12. A plurality of tubes 42 may then be coupled together in series, outlet end 46 to inlet end 44, to form the elongated cleansing flume 14. The outlet end 46 of a final one of the tubes 42 is preferably positioned above a conveyance means (not shown) that transports the cleaned plants products 28 to subsequent processing assemblies.

Each of the tubes 42 preferably has an elongated opening 48 formed through an upper end 50 thereof to allow access to an interior 52 of the tube 42. Preferably, the opening 48 is configured sufficiently narrow to inhibit water 28 passing therethrough from spilling, while being just sufficiently wide to allow access to the interior 52 thereof.

A plurality of the tubes 42 may be interconnected for thoroughly cleaning the plant product 28 passing therethrough. Connecting portions 54 (shown in FIG. 1A) are provided for coupling adjacent tubes 42 together, when it is desired to change the orientation of adjacent tubes 42, for routing the flume 14 along a desired path to obtain compactness of the invented apparatus 10. In the preferred embodiment, the connecting portions 54 comprise substantially arcuate members that are interposed between the outlet end 46 and inlet end 44 of adjacent tubes 42 and mounted thereto to couple adjacent tubes together, while the arcuate configuration of the connecting portions 54 maintains the flow rate of the slurry 30 passing through the flume 14. The connecting portions 54 may comprise either 45 degree or 90 degree arcuate elbow tubing, so that adjacent tubes 42 extend in either perpendicularly or parallel to one another, depending upon the desired path of the cleansing flume 14. The flume 14 formed by the tubes 42 and connecting portions 54 can be configured for maximizing compactness of the invention 10 to optimize workspace occupied by the present invention.

Preferably, the tubes 42 of the flume 14 can range in diameter from approximately 10 inches to approximately 24 inches. Most preferably, the tubes 42, and connecting portions 54, are approximately 16 inches in diameter. Additionally, a plurality of reinforcing bands 55 may be spatially positioned along the tubes 42 and secured to the periphery thereof. The bands 55 are provided to maintain the structural integrity of the tubes 42.

Each of the tubes 42 is preferably provided with a plurality of baffles 56 or flow diverters that are spatially positioned along a bottom surface 58 thereof. The baffles 56 are affixed to the bottom surface 58 of the tube 42 so that they extend across the surface 58 at an obtuse angle, of approximately 45 degrees for example, to a longitudinal axis L of the tube 42, for causing water 26 passing through the tube 42 to flow in a helical motion. The helical motion of the water 26, and thus the water-plant product slurry 30, flowing through the tube 42 maintains the plant product 28 substantially completely submerged, while sufficiently agitating the plant product 28 to clean the product 28, without causing damage thereto.

Additionally, the baffles 56 may be configured with a curvilinear top edge 60. The curvilinear configuration of the top edge 60 of each of the baffles 56 prevents damage from coming to the plant products 28, and particularly to the leaves of leafy plant products such as spinach, when contacting the baffles 56. The configuration of the top edge 60 additionally aids with maintaining the helical pattern of the water 26 flowing through the tubes 42, to keep the plant products 28 submerged in the water 26.

Optionally, a spray nozzle 20B may be interposed between each of the baffles 56. The spray nozzles 20B are oriented between adjacent baffles 56, such that the nozzle 20B sprays water 26 in the direction of the helical flow, to aid and maintain the flow rate of the water-plant product slurry 30 flowing through the tubes 42, and thus the flume 14. This prevents the plant product 28 from collecting in the flume 14 and clogging the flume 14. Therefore, the need for operators monitoring the flume 14 is obviated, and processing costs are reduced. The nozzles 20B are coupled to one or more supply lines 62, 64. At least one of the supply lines 62, 64 supplies water to the spray nozzles 20B, and the remaining one of the supply lines 62, 64 my be provided to supply air to the spray nozzles 20B. Thus, the spray nozzles 20B may force aerated water into the water 26 and plant product 28 flowing along the tubes 42 to further aid with removing waste matter from the plant product 28, for cleaning the product 28.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An apparatus for washing plant products comprising:
    a product loading assembly, the loading assembly including,
        a plant product receiving section, the receiving section having an opening configured to receive large volumes of plant product,
        a plurality of spray nozzles located about the periphery of the opening, an outlet of each of the nozzles positionable for adjusting the direction of fluid flowing from the outlet, the outlet of each of the nozzles positioned so that when fluid is simultaneously sprayed from each of the nozzles a turbulent fluid flow is formed in the loading assembly, the turbulent fluid flow facilitating submergence of plant product disposed in the fluid in the loading assembly to clean the plant product,
        a transitional section coupled to the receiving section, the transitional section receiving the submerged plant product and orienting the submerged plant product for downstream componentry of the apparatus, and
        a fluid manifold coupled to the spray nozzles for supplying fluid thereto, the manifold including valve means for controlling the flow rate of fluid flowing to the spray nozzles for enabling the nozzles to spray the fluid with sufficient force to form the turbulent fluid flow while preventing damage to plant products due to fluid contacting the products under excessive pressure; and
    an elongated cleansing flume coupled to the loading assembly for receiving submerged plant product therefrom for cleaning the product, the flume comprising,
        at least one elongated tubular member having an inlet end and an outlet end, the inlet end of the tubular member coupled to the transitional section for receiving the turbulent fluid and plant product submerged therein flowing through the transitional section, the tubular member including flow diverting means for maintaining the plant product substantially submerged as the product flows along the member from the inlet end toward the outlet end thereof.

2. An elongated cleansing flume for an apparatus for washing plant products, the flume comprising:
    a plurality of elongated tubular members, each of the members having an inlet end and an outlet end, the inlet end of one of the tubular members coupled to upstream componentry of the apparatus for receiving a turbulent water-plant product slurry flowing therefrom, the plurality of tubular members coupled together in series to form the elongated flume, the outlet end of a final one of tubular members forming an outlet of the flume; and
    a plurality of flow diverters spatially positioned along a bottom surface of each of the tubular members and affixed thereto, the flow diverters affixed to the bottom surface such that they extend across the surface at an obtuse angle relative to the longitudinal axis of the member, the flow diverters causing the slurry flowing along the flume to flow in a generally helical motion for maintaining plant product in the slurry substantially completely submerged, the helical motion of the slurry caused by the flow diverters sufficiently agitating the plant product for removing particulate matter therefrom to clean the product, without causing damage thereto.

3. The apparatus of claim 2 wherein each of the plurality of flow diverters is configured with a curvilinear top edge, the curvilinear configuration of the top edge inhibiting damage from coming to the plant product, when contacting the flow diverters as the slurry is flowing along the flume, the configuration of the top edge additionally aiding the helical motion of the water and slurry flowing through the tubular member to keep the plant product submerged in the water.

4. The apparatus of claim 2 wherein the flow diverters are spatially positioned along the bottom surface of each of the tubular members and affixed thereto at an angle of approximately 45 degrees.

5. The apparatus of claim 4 wherein a spray nozzle is interposed between each of the flow diverters, the nozzles oriented between adjacent flow diverters, such that the nozzle sprays water in the direction of the helical flow of the water-plant product slurry flowing through the tubular member to aid with maintaining the flow rate of the slurry flowing through the tubular members, to inhibit the plant product from collecting in the flume and clogging the flume.

6. The apparatus of claim 5 further comprising a supply manifold coupled to the spray nozzles for supplying water thereto, the manifold including valve means for controlling the flow rate of water flowing to the spray nozzles for enabling the nozzles to spray the fluid with sufficient force to form the turbulent fluid flow while prevented damage to plant products due to fluid contacting the products under excessive pressure.

7. The apparatus of claim 6 wherein the air is supplied to the spray nozzles for forcing aerated water into the slurry flowing along the tubular members to enhance cleaning of the plant product.

8. The apparatus of claim 2 further comprising connecting portions for coupling adjacent tubular members together, when it is desired to change the orientation of adjacent tubular members, for routing the flume along a desired path to optimize workspace occupied by the flume, the connecting portions comprising substantially arcuate members that are interposed between the outlet end and inlet end of adjacent tubular members and mounted thereto to couple adjacent tubular members together, the arcuate configuration of the connecting portions maintaining the flow rate of the slurry passing through the flume, the connecting portions comprising a selected one of a 45 degree arcuate elbow and a 90 degree arcuate elbow, such that adjacent tubular members extend a selected one of generally perpendicularly and generally parallel to one another, depending upon a desired path of the flume.

9. A plant product loading assembly for an apparatus for washing plant products, the assembly comprising:

a conical plant product receiving section, the receiving section having an opening configured to receive large volumes of plant product;

a plurality of spray nozzles spatially positioned about the periphery of the opening, an outlet of each of the nozzles positionable for adjusting the direction of water flowing from the outlet, such that when water is simultaneously sprayed from each of the nozzles a turbulent fluid flow is formed in the receiving section, the turbulent fluid flow facilitating submergence of plant product disposed in the fluid in the loading assembly to form a water-plant product slurry, the turbulence of the fluid ensuring that a maximum amount of plant product mixes with the water to form a slurry that optimizes water usage of the apparatus and quickly cleans the product;

a conical transitional section made integral with the receiving section, the transitional section being arcuate along its length for orienting the water-plant product slurry for downstream componentry of the apparatus, the conical configuration of each of the receiving section and transitional section enhancing fluid flow therethrough to inhibit clogging of the transitional section due to the plant product collecting therein; and a fluid manifold coupled to the spray nozzles for supplying water thereto, the manifold including valve means for controlling the flow rate of water flowing to the spray nozzles for enabling the nozzles to spray the water with sufficient force to form the turbulent fluid flow while preventing damage to plant products due to water contacting the plant product under excessive pressure.

10. The apparatus of claim 9 wherein the manifold further includes a plurality of valve means for controlling the flow rate of water output by each of the spray nozzles to adjust the turbulence patterns of the water in the receiving section for preventing damage to the plant product, while maintaining optimal mixture of the plant product with the water for forming the slurry.

11. An apparatus for washing plant products comprising:

a product loading assembly, the loading assembly including, a conical plant product receiving section, the receiving section having an opening configured to receive large volumes of plant product, plurality of spray nozzles spatially positioned about the periphery of the opening, an outlet of each of the nozzles positionable for adjusting the direction of water flowing from the outlet, such that when water is simultaneously sprayed from each of the nozzles a turbulent fluid flow is formed in the receiving section, the turbulent fluid flow facilitating submergence of plant product disposed in the fluid in the loading assembly to form a water-plant product slurry, the turbulence of the fluid ensuring that a maximum amount of plant product mixes with the water to form a slurry that optimizes water usage of the apparatus and quickly cleans the product, a conical transitional section made integral with the receiving section, the transitional section being arcuate along its length for orienting the water-plant product slurry for downstream componentry of the apparatus, the conical configuration of each of the receiving section and transitional section enhancing fluid flow therethrough to inhibit clogging of the transitional section due to the plant product collecting therein, and a fluid manifold coupled to the spray nozzles for supplying water thereto, the manifold including valve means for controlling the flow rate of water flowing to the spray nozzles for enabling the nozzles to spray the water with sufficient force to form the turbulent fluid flow while preventing damage to plant products due to water contacting the plant product under excessive pressure; and an elongated cleansing flume coupled to the loading assembly for receiving submerged plant product therefrom for cleaning the product, the flume comprising, a plurality of elongated tubular members, each of the members having an inlet end and an outlet end, the inlet end of one of the tubular members coupled to upstream componentry of the apparatus for receiving a turbulent water-plant product slurry flowing therefrom, the plurality of tubular members coupled together in series to form the elongated flume, the outlet end of a final one of tubular members forming an outlet of the flume, and a plurality of flow diverters spatially positioned along a bottom surface of each of the tubular members and affixed thereto, the flow diverters affixed to the bottom surface such that they extend across the surface at an obtuse angle relative to the longitudinal axis of the member, the flow diverters causing the slurry flowing along the flume to flow in a generally helical motion for maintaining plant product in the slurry substantially completely submerged, the helical motion of the slurry caused by the flow diverters sufficiently agitating the plant product for removing particulate matter therefrom to clean the product, without causing damage thereto.

12. The apparatus of claim 11 wherein each of the plurality of flow diverters is configured with a curvilinear top edge, the curvilinear configuration of the top edge inhibiting damage from coming to the plant product, when contacting the flow diverters as the slurry is flowing along the flume, the configuration of the top edge additionally aiding the helical motion of the water and slurry flowing through the tubular member to keep the plant product submerged in the water.

13. The apparatus of claim 12 wherein the flow diverters are spatially positioned along the bottom surface of each of the tubular members and affixed thereto at an angle of approximately 45 degrees.

14. The apparatus of claim 13 wherein a spray nozzle is interposed between each of the flow diverters, the nozzles oriented between adjacent flow diverters, such that the nozzle sprays water in the direction of the helical flow of the water-plant product slurry flowing through the tubular member to aid with maintaining the flow rate of the slurry flowing through the tubular members, to inhibit the plant product from collecting in the flume and clogging the flume.

15. The apparatus of claim 11 wherein the manifold is coupled to the spray nozzles located in the tubular members 
for supplying water thereto, the manifold including valve means for controlling the flow rate of water flowing to the spray nozzles for enabling the nozzles to spray the fluid with sufficient force to form the turbulent fluid flow while prevented damage to plant products due to fluid contacting the products under excessive pressure.

16. The apparatus of claim 15 wherein the air is supplied to the spray nozzles for forcing aerated water into the slurry flowing along the tubular members to enhance cleaning of the plant product.

17. The apparatus of claim 11 further comprising connecting portions for coupling adjacent tubular members together, when it is desired to change the orientation of adjacent tubular members, for routing the flume along a desired path to optimize workspace occupied by the flume, the connecting portions comprising substantially arcuate members that are interposed between the outlet end and inlet end of adjacent tubular members and mounted thereto to couple adjacent tubular members together, the arcuate configuration of the connecting portions maintaining the flow rate of the slurry passing through the flume, the connecting portions comprising a selected one of a 45 degree arcuate elbow and a 90 degree arcuate elbow, such that adjacent tubular members extend a selected one of generally perpendicularly and generally parallel to one another, depending upon a desired path of the flume.

18. The apparatus of claim 17 wherein each of the tubular members is configured with an elongated opening formed through an upper end thereof to allow access to an interior of the tubular members, the opening configured sufficiently narrow to inhibit water passing therethrough from spilling, while being just sufficiently wide to allow access to the interior thereof.

* * * * *